United States Patent
Klemm et al.

(10) Patent No.: US 10,552,725 B2
(45) Date of Patent: Feb. 4, 2020

(54) TRANSPONDER APPARATUS

(71) Applicant: SMARTRAC TECHNOLOGY GmbH, Leinfelden-Echterdingen (DE)

(72) Inventors: Lars Klemm, Hoyerswerda (DE); Carsten Nieland, Gotha (DE); Sebastian Gallschütz, Langebrück (DE)

(73) Assignee: SMARTRAC TECHNOLOGY GMBH, Leinfelden-Echterdingen (DE)

( * ) Notice: Subject to any disclaimer, the term of this patent is extended or adjusted under 35 U.S.C. 154(b) by 0 days.

(21) Appl. No.: 15/753,557

(22) PCT Filed: Aug. 17, 2016

(86) PCT No.: PCT/EP2016/069512
§ 371 (c)(1),
(2) Date: Feb. 20, 2018

(87) PCT Pub. No.: WO2017/029324
PCT Pub. Date: Feb. 23, 2017

(65) Prior Publication Data
US 2018/0240005 A1    Aug. 23, 2018

(30) Foreign Application Priority Data
Aug. 17, 2015    (EP) .................................... 15181277

(51) Int. Cl.
*G06K 19/06*    (2006.01)
*G06K 19/077*   (2006.01)

(52) U.S. Cl.
CPC .............................. *G06K 19/07786* (2013.01)

(58) Field of Classification Search
CPC ........... G06K 19/07786; G06K 19/025; G06K 19/072; G06K 19/07767
(Continued)

(56) References Cited

U.S. PATENT DOCUMENTS 8,646,695 B2   2/2014  Worrall et al.
8,905,317 B1  12/2014  Hsu et al.
(Continued)

OTHER PUBLICATIONS

International Search Report, Application No. PCT/EP2016/069512, dated Nov. 11, 2016, 3 pages.
(Continued)

*Primary Examiner* — Karl D Frech
(74) *Attorney, Agent, or Firm* — Ziegler IP Law Group, LLC

(57) ABSTRACT

A transponder apparatus for a transponder unit has a UHF and HF transponder The UHF transponder has a transponder support, a UHF antenna and a UHF chip. The HF transponder has an HF antenna and an HF chip. The UHF antenna is at the transponder support and is made up of conducting UHF antenna structures in transponder support planes which are spatially separated from one another. The transponder apparatus includes an electrically-insulating attachment layer connecting the UHF transponder to the HF antenna. The transponder apparatus includes an electrically-insulating spacer element connected to the HF transponder and which spatially separates the UHF transponder and the HF transponder relative to a body. The UHF transponder is disposed on the HF antenna. A conducting HF antenna structure of the HF antenna extends beyond a covering surface of the UHF transponder and the HF antenna structure.

20 Claims, 8 Drawing Sheets

Figure 1:
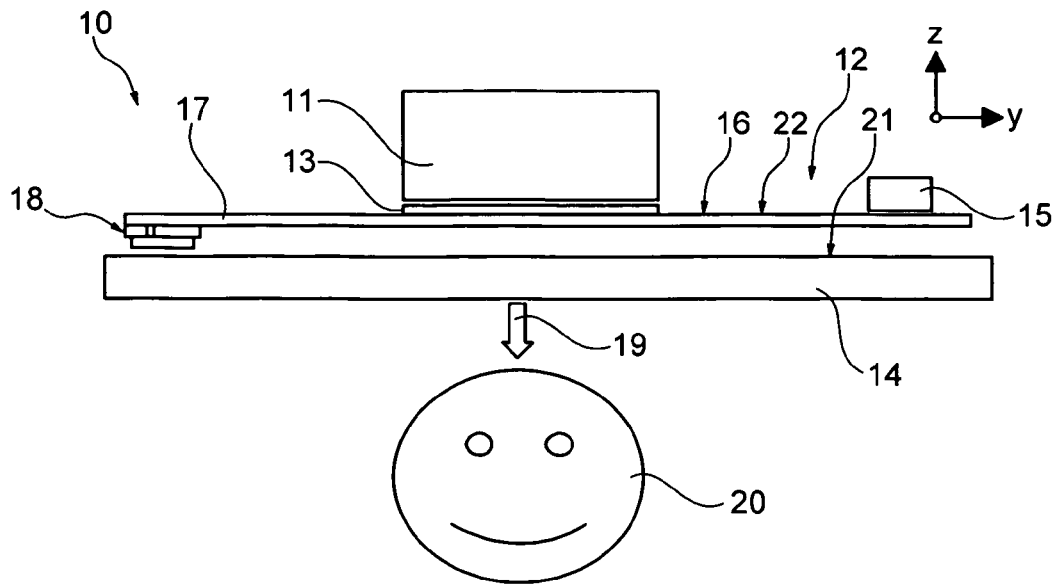

(58) Field of Classification Search
USPC .................................................. 235/492, 487
See application file for complete search history.

(56) References Cited

U.S. PATENT DOCUMENTS

| | | | | |
|---|---|---|---|---|
| 2006/0091225 | A1* | 5/2006 | Forster | G06K 19/07718 |
| | | | | 235/492 |
| 2015/0254548 | A1* | 9/2015 | Ikemoto | H01Q 5/35 |
| | | | | 235/492 |
| 2015/0294210 | A1* | 10/2015 | Martinez de Velasco Cortina | |
| | | | | G06Q 20/28 |
| | | | | 235/492 |

OTHER PUBLICATIONS

Written Opinion of the International Searching Authority, Application No. PCT/EP2016/069512, dated Nov. 11, 2016, 5 pages.

* cited by examiner

TRANSPONDER APPARATUS

The aspects of the disclosed embodiments relate to a transponder apparatus for a transponder unit that can be worn on a human or animal body, such as a collar, band or the like, comprising a UHF transponder and an HF transponder, wherein the UHF transponder includes a transponder holder, a UHF antenna and a UHF chip, wherein the HF transponder includes an HF antenna and an HF chip, wherein the UHF antenna is disposed at the transponder holder and comprises conducting UHF antenna structures in transponder holder planes that are separated from one another by a distance. The invention further relates to a transponder unit comprising a transponder apparatus.

Such transponder apparatuses are already sufficiently known and are used regularly for designing portable transponder units. For example, a portable transponder unit can be a collar or band, a tag or a similar device that can be worn directly on a body of a person or animal. For example, there are known armbands that comprise one or more RFID transponders for communication with a transmitter-receiver system.

The aspects of the disclosed embodiments relate in particular to the area of passive RFID transponders for use in high-frequency areas (HF) from 10 to 15 MHz and for use in ultra high-frequency areas (UHF) from 850 to 950 MHz. Below, reference will be made to the above-mentioned frequency ranges with the respective abbreviations.

Passive HF transponders are used regularly for communication with a transmitter-receiver system in a near-field range of a few centimeters up to 0.5 m. Passive UHF transponders are used regularly for communication with a transmitter-receiver system in a remove range of 3 to 6 m. Such HF transponders respond overwhelmingly to a magnetic component of electromagnetic radiation from the transmitter-receiver system, which is why HF transponders can only communicate within a few centimeters away from a transmitter receiver system, and therefore are very useful for safety-related applications. Passive UHF transponders, on the other hand, react well to remote electromagnetic fields of a transmitter-receiver system and are more sensitive to interference from conducting objects such as metals or persons, which can also absorb an electromagnetic field. Because of their range, UHF transponders are used for less safety-related functions, such as for the detection of a person or an object. To avoid having to use a dedicated transponder unit for each of these RFID transponders, for example in the form of a card, a known method involves installing or disposing HF transponders and UHF transponders together in a single transponder unit. In the process, this transponder unit is designed so that it can be worn on a body of a person or animal without the functionality of the RFID transponder being substantially affected by the proximity to the body. Moreover, the HF transponder and the UHF transponder should be placed in as compact a configuration as possible so as to more easily install them in a transponder unit, the transponder apparatus so designed also being more cost-effectively manufactured in large numbers at the same time.

Such a transponder apparatus is known from U.S. Pat. No. 8,646,695 B2, the apparatus able to be implemented in an arm band. Here, a variety of embodiments of a transponder apparatus is disclosed, wherein in every embodiment only one shielding metal film is provided, disposed between the actual RFID transponders and a body of a person. In a first embodiment, UHF transponder and an HF transponder are disposed on a common dielectric support. An HF antenna is designed with windings, wherein an HF chip is connected to the windings. A UHF antenna is made up of two metallic films passing over a top side and a bottom side of the dielectric support. A UHF chip is connected to the metallic film. The dielectric support with the UHF transponder is fastened to the shielding metal film by way of an adhesive layer, wherein the HF transponder in turn is attached to a surface area of the dielectric support or metallic film of the UHF antenna. In particular, in the process there is disposed between the HF transponder and the UHF transponder a ferritic layer for purposes of magnetic absorption. This ferritic layer reduces the range of the UHF transponder due to the arrangement of the layer on the UHF antenna, and increases the material costs for the transponder apparatus. Furthermore, in the manufacture of the transponder apparatus, very precise placement of the ferritic layer and the HF transponder is required if the range of the respective RFID transponders is not allowed to vary substantially during large scale production. The transponder apparatus also comprises a plurality of components and is comparatively thick due to the many different layers. Having a number of components and a galvanic connection of the metallic film of the UHF antenna and a ferritic material layer all have a negative effect on manufacturing costs.

A second embodiment of a transponder apparatus disclosed by U.S. Pat. No. 8,646,695 B2 comprises a one-dimensional UHF antenna with a UHF chip mounted therein on a shielding metal film provided on the backside thereof with a protective layer. Since the UHF antenna is adhesively attached directly to the shielding metal film, a range of the UHF transponder is limited in that the metal film can shield the UHF antenna depending on the position of the transponder apparatus relative to a transmitting-receiving system, such that the UHF transponder may be recognizable only to a limited extent. A rigid dielectric spacer element with an HF chip adhesively attached thereto and an HF antenna is disposed on the UHF transponder. Here, as well, precise positioning of the HF antenna and the UHF antenna and the shielding metal film relative to one another is required in order to ensure reliable functioning of the transponder apparatus.

In a third embodiment of a transponder apparatus shown in U.S. Pat. No. 8,646,695 B2, a dielectric support is made up of three layers of a ceramic material, wherein the UHF antenna is designed in the form of metal films connected together in different planes of the dielectric support. The HF antenna is disposed together with windings on a top side of the dielectric support, and is surrounded by a metal film of the UHF antenna. The dielectric support is in turn adhesively attached to a shielding metal film. The metal film of the UHF antenna, the UHF chip and a HF chip with the HF antenna are each designed using a plurality of pressure contacts designed into the dielectric ceramic layers. Use of the ceramic material for the dielectric support and the through-contacting required for the layered design make the manufacture of this transponder apparatus considerably more expensive. Here, as well, the range of the UHF transponder is limited by the use of the shielding metal film.

The aspects of the disclosed embodiments provide a transponder apparatus which is more easily recognized by a transmitter-receiver system and at the same time can be manufactured with a low design height and in great numbers cost effectively.

The transponder apparatus according to the aspects of the disclosed embodiments, which are used for a transponder unit that can be worn on a human or animal body, such as a collar, band or the like, comprises a UHF transponder and an HF transponder, wherein the UHF transponder is made up of a transponder support, a UHF antenna and a UHF chip, wherein the HF transponder is made up of an HF antenna and an HF chip, wherein the UHF antenna is disposed at the transponder support and is made up of conducting UHF antenna structures in spatially separated planes of the transponder support, wherein the transponder apparatus comprises an electrically insulating attachment layer which connects the UHF transponder to the HF antenna, wherein the transponder apparatus comprises an electrically insulating spacer element which is connected to the HF transponder and which separates the UHF transponder and the HF transponder from the body at a distance relative thereto, wherein the UHF transponder is disposed on the HF antenna, wherein a conducting HF antenna structure of the HF antenna extends beyond a covering surface of UHF transponder and the HF antenna structure.

Accordingly, in the aspects of the disclosed embodiments it is provided that the UHF transponder must be placed at a distance relative to an abutting area on a human or animal body on the HF antenna such that the UHF transponder covers the HF antenna structure in some areas. However, the HF antenna structure is designed to be larger with respect to the surface area and geometric reach thereof than the UHF transponder so that, advantageously, the common covering surface only pertains to a smaller portion of the HF antenna structure. The arrangement of the UHF transponder on the HF antenna structure is made possible by locating the electrically insulating attachment layer between the UHF transponder and the HF antenna structure or HF transponder. By locating the UHF transponder on the HF antenna structure, it becomes especially easy to recognize the UHF transponder, in contrast to the reverse arrangement.

The apparatus according to the aspects of the disclosed embodiments may in fact worsen a recognizability of the HF transponder, but this is not essential to the functioning of the passive transponder apparatus since the HF transponder only needs to be recognizable within short distances of a few centimeters from a transmitter-receiver system anyway. The HF transponder is provided for safety-related applications in particular in the transponder units of this class, such that in this case an improvement in a read distance might even be seen as a disadvantage. In safety-related applications, it can even be advantageous to keep the HF transponder directly at the transmitter-receiver system. Accordingly, the invention provides a means for improving a recognizability of the UHF transponder at the cost of a recognizability of the HF transponder.

Furthermore, the electrically insulating spacer element makes it possible to increase a distance of the HF transponder and the UHF transponder relative to a body and to do away with a shielding element or shielding metal film as is known from the prior art, which can significantly improve a recognizability of the UHF transponder. Thus, by increasing a distance from the body a shading or shielding of the UHF transponder is less probable depending on the relative position to a transmitter-receiver system. Also, because the HF transponder is connected directly to the spacer element and because no magnetic or ferritic absorber layer is necessary, a transponder apparatus design height in a vertical direction is comparatively small relative to a body. Moreover, expensive materials for forming additional layers or coats can be eliminated. Also, a precise placement of the UHF transponder on the HF antenna structure is not of great importance for recognizability of the UHF transponder. Overall, therefore, the transponder apparatus is cost-effective to manufacture.

The common covering surface of UHF transponder and HF antenna structure can be designed smaller than one third, preferably one fourth, and more preferably one fifth of a geometric reach of the HF antenna structure. The geometric reach is understood here to mean a two-dimensional surface that takes up the HF antenna structure. Consequently, the HF antenna structure can only be designed in one plane. For example, the HF antenna can be designed with windings formed by way of stamping, printing, winding, laying wire or etching of a metallization. The result of the relatively smaller covering surface is that switching to a manufacturing environment for the large scale production of the HF transponder, for example a change in the placement of the UHF transponder on the HF antenna structure, has very little effect on an recognizability of the HF transponder.

The HF transponder can be designed without a substrate, wherein the HF antenna can then be connected directly to the spacer element. For example, the HF antenna can be made of windings of metal film, the windings able to be adhesively attached directly to the spacer element or laminated with the spacer element. Furthermore, the HF antenna can be directly connected to the spacer element, which is made of a correspondingly suitable synthetic material, by way of hot-melt adhesive, pressing or hot stamping. A fastening of the HF chip can also be done on or in the spacer element in this regard. Likewise, a necessary HF antenna structure bridge can be formed by way of a partially insulated metallic strip, wherein the metallic strip can be connected electrically to windings of the HF antenna structure by way of crimping, soldering, welding, pressing or adhesively.

The HF transponder can alternatively comprise a support substrate on which the HF antenna is disposed. The HF antenna structure and the HF chip can be connected to the support substrate using one of the methods mentioned above. By using the support substrate, it is possible to manufacture the HF transponder separately from the spacer element. For example, the HF transponder can then be manufactured in large numbers on support substrate sheets, for example, or a strip of support substrate. A connection to the spacer element can then be done through lamination, for example, or adhesion as part of final assembly as needed. This makes the transponder apparatus designable in modular form, and can be tailored easily to requirements of different customers.

The transponder apparatus can comprise a resonator with a conducting UHF resonator structure. The UHF resonator structure can designed such that the HF antenna structure has a metal fraction of 70% relative to a geometric reach of the HF antenna structure. The UHF resonator structure is preferably made of a suitable metal or a metallization or metal film and thereby be located relative to the UHF antenna in such a way that recognizability of the UHF transponder is improved.

Hence, the conducting UHF resonator structure can form a conducting resonator surface.

The UHF resonator structure becomes especially cost-effective to manufacture when it is designed in a common conduction plane with the HF antenna structure. The UHF resonator structure can then be manufactured on a common support substrate as in the HF antenna, for example by forming in a common work step. Also, the UHF resonator structure then doesn't increase a thickness of the transponder apparatus.

The UHF resonator structure can be formed by at least one widened winding section of a winding of the HF antenna structure. Then, it never becomes necessary to design the UHF resonator structure to be separated from the HF antenna structure. For example, two parallel windings of the HF antenna structure can be designed broader than the remaining windings in order to form the UHF resonator structure. Also, it may already be sufficient to form just one winding section broader.

Part of the resonator surface can be designed with the covering surface overlapping. In this can, it is also only the part of the surface that comprises the required metal portion. Also, the part of the surface can be designed larger than the covering surface, in other words the surface part can extend beyond the covering surface. The part of the surface can also be designed such that it is longer and narrower than the covering surface relative to a longitudinal axis of the HF antenna structure.

The UHF resonator structure can be designed independently of the HF antenna structure, wherein the resonator surface can be designed at a distance from the covering surface. Thus, the UHF resonator structure can be designed adjacent and electrically insulated from the HF antenna structure. Then, the resonator surface cannot be designed to also overlap with the covering surface. Thus, it is possible to design the resonator surface completely free of the HF antenna structure in a nearly arbitrary shape, which can further improve the recognizability of the UHF transponder.

The UHF resonator structure can comprise a coupling element for inductively or capacitively coupling the resonator with the UHF antenna. The coupling element can be a conductive surface or conductive loop, for example, the surface or loop being designed as a part of the UHF resonator structure. The coupling element can be used to tune the UHF transponder, for example.

The transponder apparatus according to the aspects of the disclosed embodiments, which are used for a transponder unit that can be worn on a human or animal body, such as a collar, band or the like, comprises a UHF transponder and an HF transponder, wherein the UHF transponder is made up of a transponder support, a UHF antenna and a UHF chip, wherein the HF transponder is made up of an HF antenna and an HF chip, wherein the UHF antenna is disposed at the transponder support and is made up of conducting UHF antenna structures in spatially separated planes of the transponder support, wherein the HF antenna is disposed at the transponder support in a common plane with an upper UHF antenna structure, wherein the transponder apparatus comprises an electrically insulating attachment layer and an electrically-insulating spacer element, wherein the spacer element is connected to the UHF transponder by way of the attachment layer and separates the UHF transponder and the HF transponder from the body at a distance relative to the body, wherein the upper UHF antenna structure surrounds at least partially the HF antenna structure or the upper UHF antenna structure and the HF antenna structure are disposed in opposite sections of the common plane, respectively.

In this transponder apparatus according to the aspects of the disclosed embodiments, as in the transponder apparatus according to the present disclosure described above, there is no need for the use of superfluous layers or coats for forming the transponder apparatus. In this case as well, a means for improving a recognizability of the UHF transponder at the cost of a recognizability of the HF transponder is provided. By forming the HF antenna together with the upper UHF antenna structure in a common plane, the transponder apparatus can be designed to be particularly compact and thin. For example, the UHF antenna structure can notch out a section of the upper plane, and the HF antenna structure can be disposed within said section. In the process, the UHF antenna structure can also completely surround or include the HF antenna structure so that the HF antenna structure can be incorporated within a geometric reach of the UHF antenna structure. As already explained above, the UHF antenna structure, HF antenna structure and/or the resonator can be formed by way of a laying method, which can be two- or three-dimensional, through a printing or coating method or through etching of a metallization. The transponder support is fastened to the electrically insulating attachment layer at the electrically insulating spacer element, which in this case as well allows one to dispense with special metallic films or layers for shielding the UHF antenna structure. Furthermore, it is also not necessary here to use a magnetic absorption layer. The transponder apparatus according to the invention therefore represents an alternative solution to the object of the invention.

The transponder apparatus can comprise a resonator with a conducting UHF resonator structure that can be disposed on the spacer element. The resonator can be designed similar to the resonator described above. In particular, the UHF resonator structure can be disposed directly on the spacer element, wherein the electrically-insulating attachment layer can then be applied, at least partially, to the UHF resonator structure. Here, as well, the resonator can substantially improve a recognizability of the UHF transponder.

A galvanic connection can be established between the HF antenna structure and the upper UHF antenna structure. The galvanic connection can be easily established between a winding of the HF antenna structure and an adjacent surface section of the upper UHF antenna structure.

Furthermore, the upper UHF antenna structure in the common plane can has a larger geometric reach than a conducting HF antenna structure of the HF antenna. To avoid negatively affecting a recognizability of the UHF transponder by arranging the HF antenna in the common plan, the upper UHF antenna structure in the common plane can be provided with a larger geometric reach than the conducting HF antenna structure, in other words said upper antenna takes up a larger surface area in the common plane.

The HF transponder can comprise an inductive coupling element within the transponder support and below the HF antenna structure to guide field lines of the HF antenna. This allows one to also improve a range of recognition of the HF transponder.

The transponder support can be designed from substrate layers in a stacked arrangement, wherein the conducting UHF antenna structures can be designed in at least three planes of the transponder support. Accordingly, the transponder support can comprise at least two substrate layers which can be connected together with an intermediate layer therebetween of a UHF antenna structure by way of known connection methods such as welding, lamination or adhesion. Based on a vertical direction relative to a body, a top side of an upper substrate layer and a bottom side of a lower substrate layer can then also serve to take up an upper UHF antenna structure and a lower UHF antenna structure, respectively. Optionally, it is also possible to design the transponder support with more than two substrate layers, and therefore more than three layers with conducting UHF antenna structures. Overall, large surface-area UHF antenna structures can be integrated into a compact transponder support in this way. The compact design of the transponder support makes it possible, in addition to designing a small transponder apparatus, to dispose the transponder support on an HF antenna structure.

The conducting UHF antenna structures can be connected conductively by way of at least one clip, wherein the clip can grasp the transponder support and apply a clamping force to UHF antenna structures which are oppositely disposed in the respective planes. In particular, when the UHF antenna structures are made of a metallization or metal film, the clip can be pushed or slipped on laterally onto parallel planes of the transponder support and in this way the conducting UHF antenna structures of the UHF antenna can be connected together. The clip can be made of metal and the clamping force can act on the UHF antenna structures by way of shoulders which abut directly against the UHF antenna structures, and if necessary engage therewith. In the process, the shoulders can engage in a surface of the UHF antenna structures to form a particularly reliable electrical contact. Also, the clip can be an inexpensively available semi-finished product, making the transponder support even easier to manufacture.

The transponder support can alternatively also comprise inductive or capacitive coupling elements that can inductively or capacitively connect to the opposing UHF antenna structures disposed in the respective planes. Accordingly, this can allow one to completely do away with an electrically conducting, galvanic, soldered or clip connection of the UHF antenna structures. The inductive or capacitive coupling elements can be designed into the respective planes off the substrate layers as part of the formation of the UHF antenna structures. Then, additional work steps are no longer required in addition to the connecting of the substrate layers through known connection techniques. Also, an inductive or capacitive connection can be provided between the HF antenna structure and the UHF antenna structure by way of inductive or capacitive coupling elements. The connection can be made in the manner of a functional connection of UHF antenna and HF antenna.

The transponder unit according to the aspects of the disclosed embodiments are designed to be worn on limbs or a human or animal body, in particular as a collar, band or the like, wherein the transponder unit comprises a transponder apparatus according to the present disclosure. The advantages of the transponder unit according to the aspects of the disclosed embodiments are referred to in the description of the advantages of the transponder apparatus according to the present disclosure.

The transponder unit can comprise a plastic housing which surrounds the transponder apparatus. For example, the transponder unit can be cast in the housing, incorporated by way of lamination or welded in the housing. The plastic of the housing can be flexible and/or elastic. Furthermore, the housing can assume a shape of an arm band or bracelet.

Further advantageous embodiments of a transponder unit can be found in the dependent claims that refer back to device claims 1 and 11.

The substrate layers of the transponder support and/or the support substrate of the HF transponder, as well as the spacer element, can be made of a thermoplastic, a duroplastic, a non-woven material, a woven material, a matte or paper, or combinations thereof. The HF chip and/or the UHF chip can be connected by way of known contacting methods to the UHF antenna and HF antenna, respectively. The connection can be made before, during or after a mounting of the UHF transponder with the HF transponder. A method for creating the respective transponder apparatus or transponder unit results from the structural setup of the transponder apparatus.

In the following, preferred embodiments of the present disclosure will be explained in more detail with reference to the attached drawings.

Figure 2:
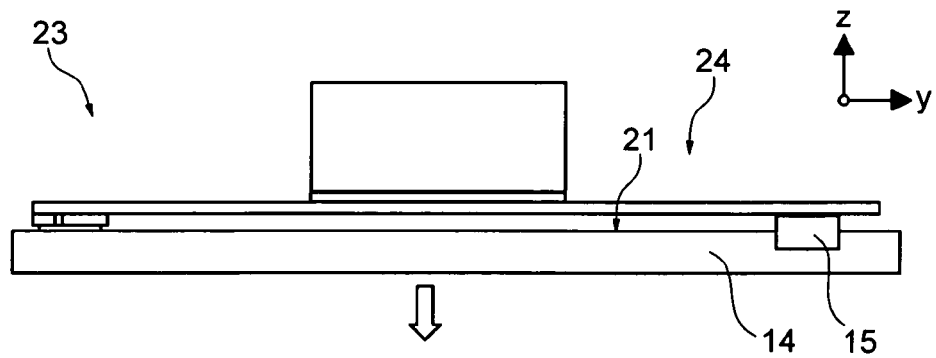
Figure 3:
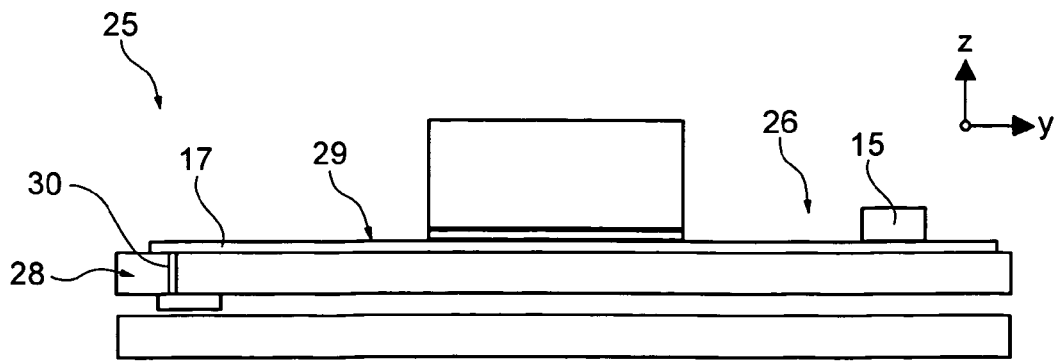
Figure 4:
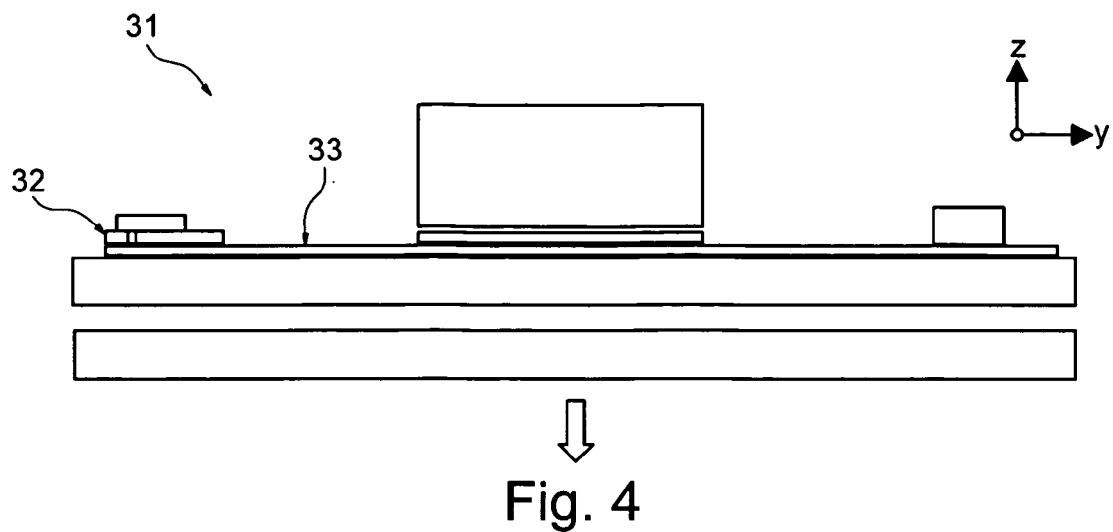
Figure 5:
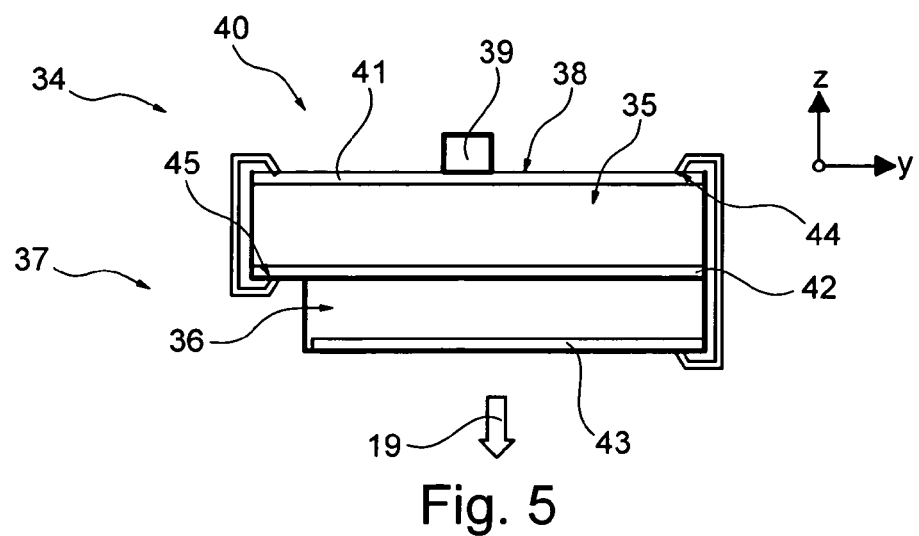
Figures 6, 7:
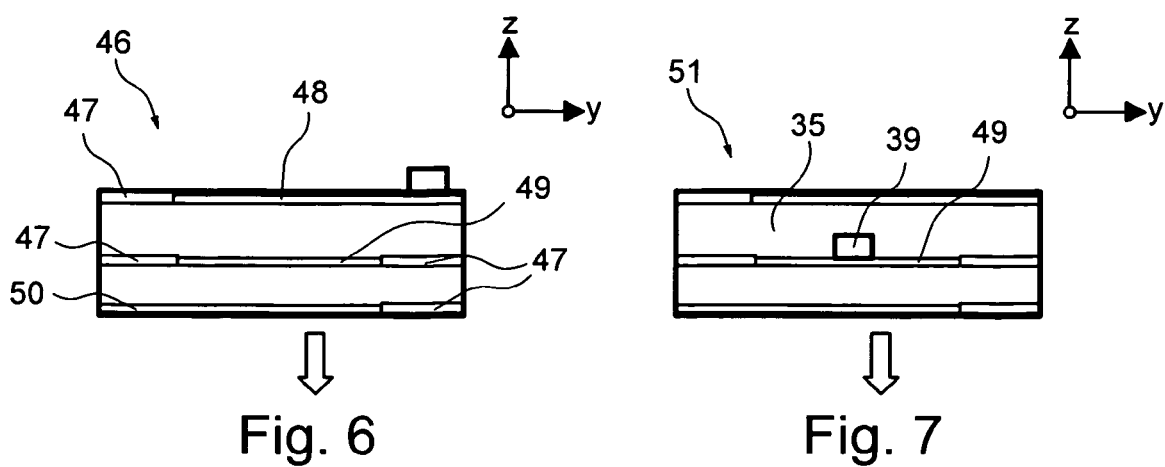
Figure 8:
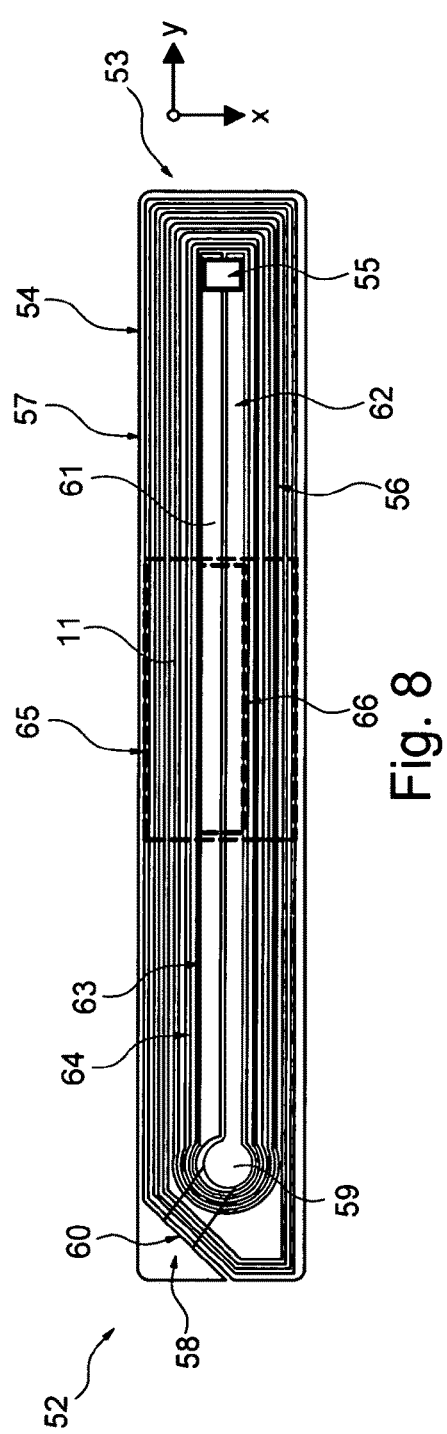
Figure 9:
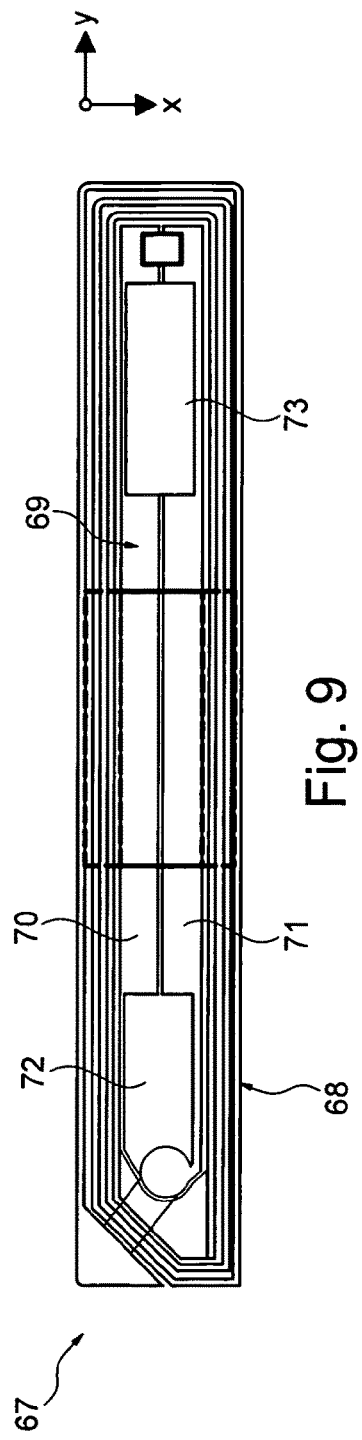
Figure 10:
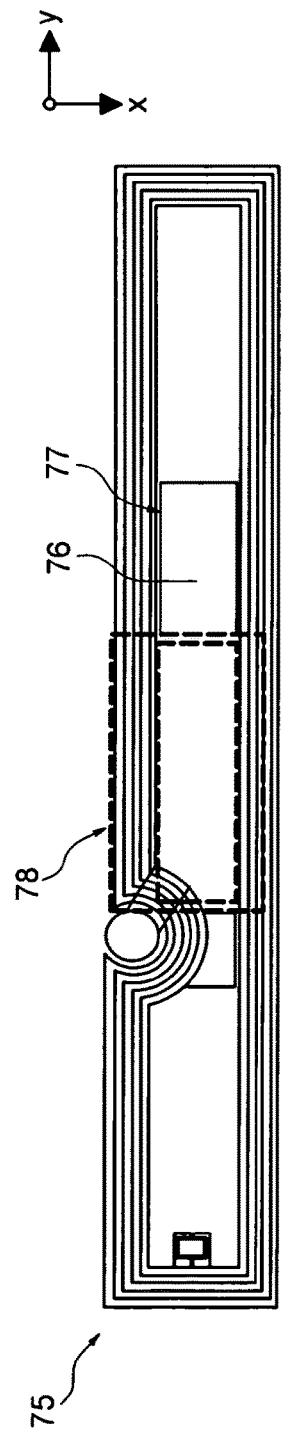
Figure 11:
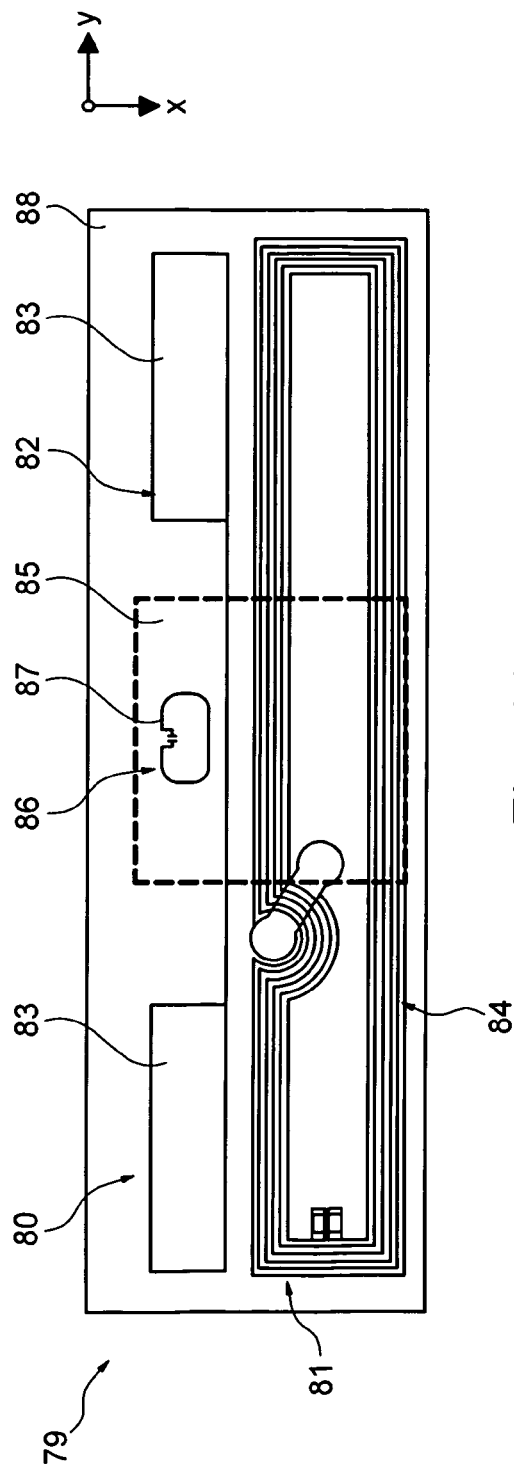
Figure 12:
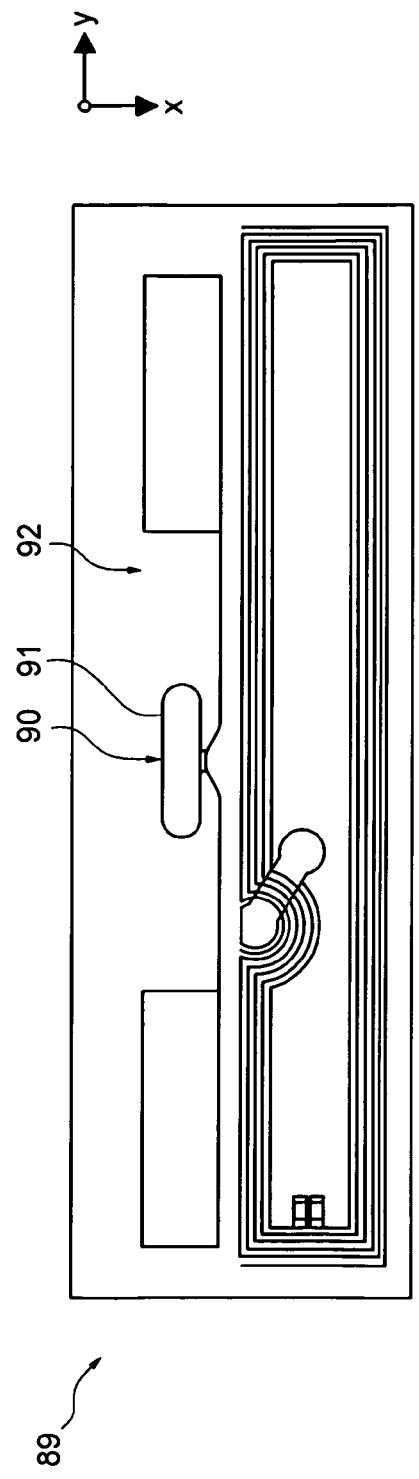
Figure 13:
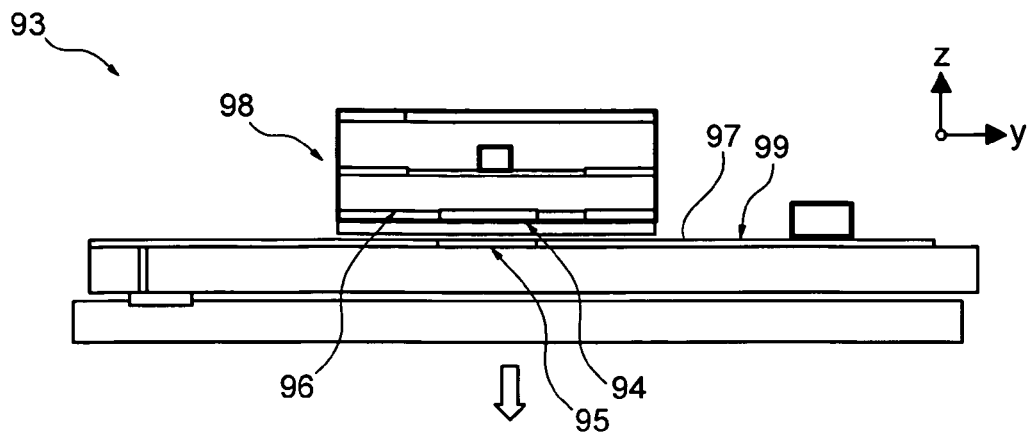
Figure 14:
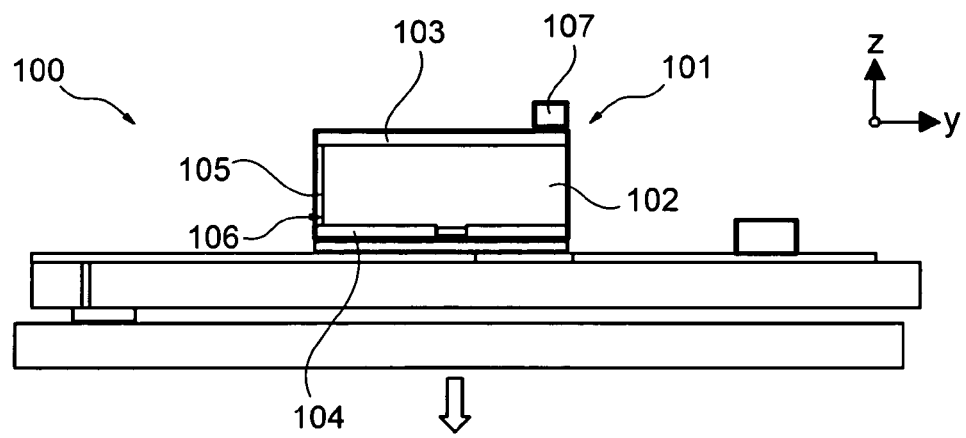
Figure 15:
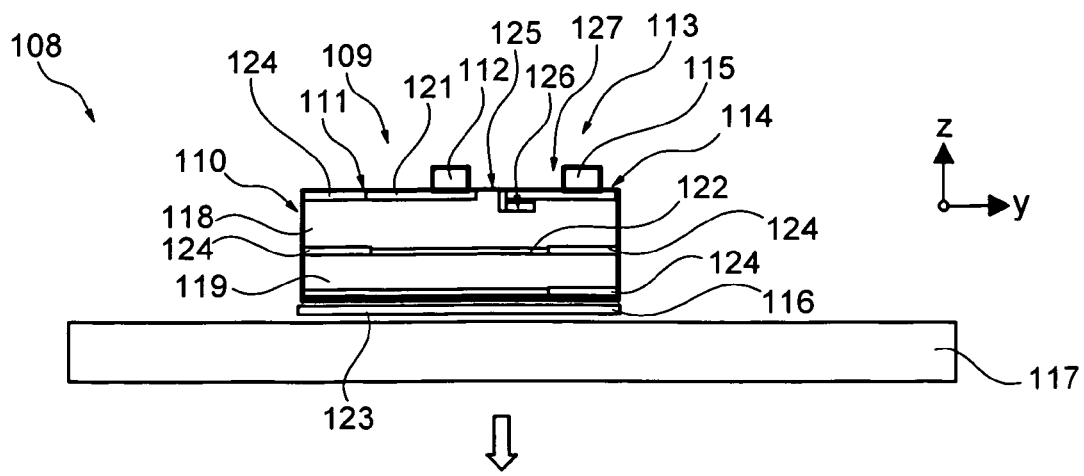
Figure 16:
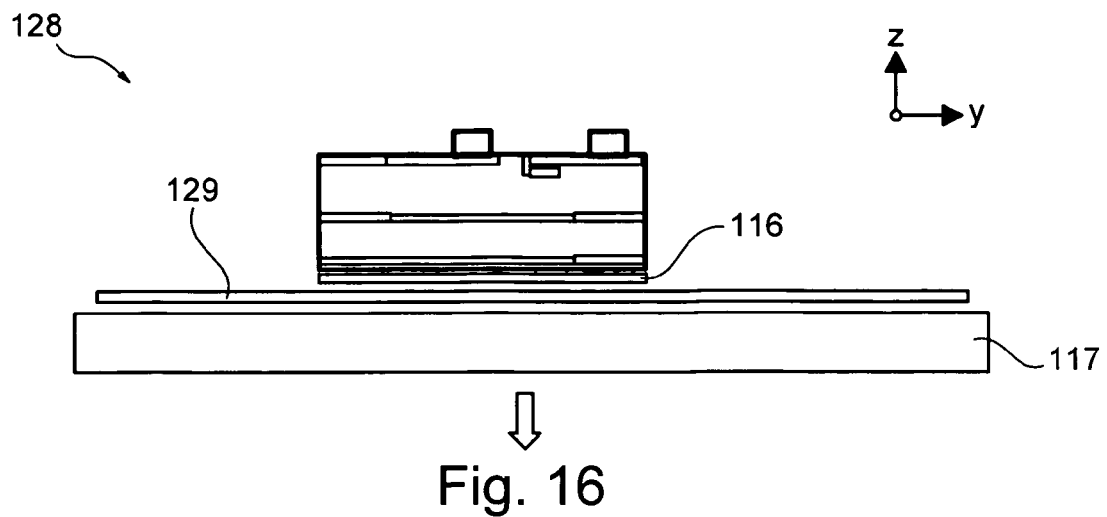
Figure 17:
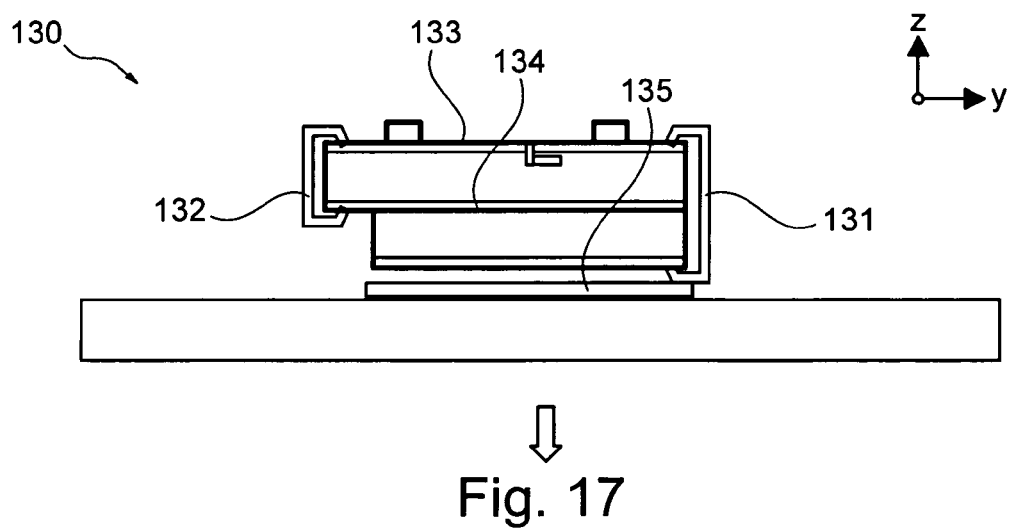
Figure 18:
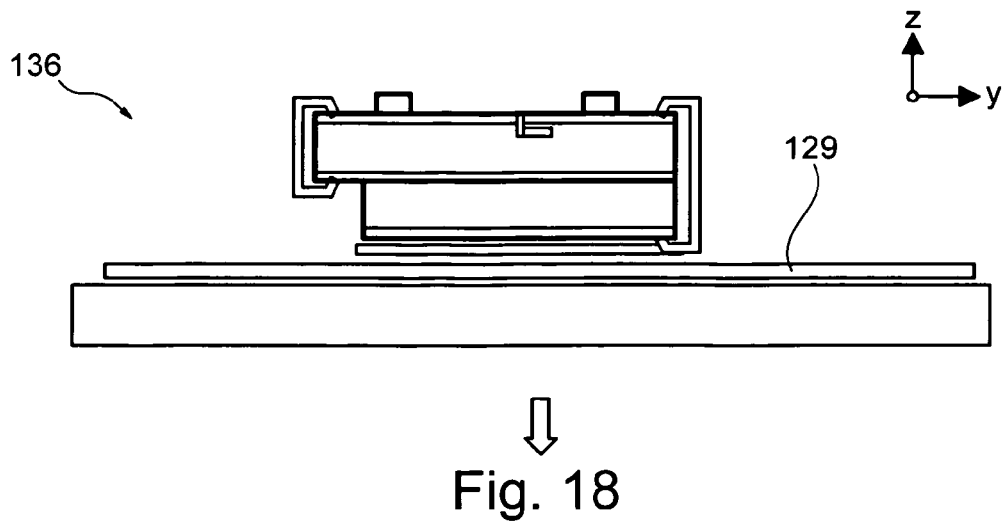
Figure 19:
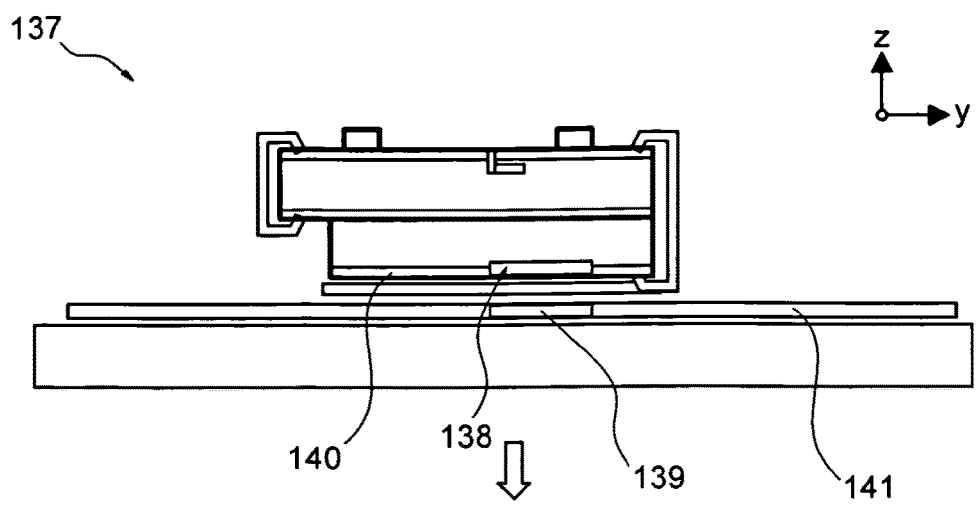
Figure 20:
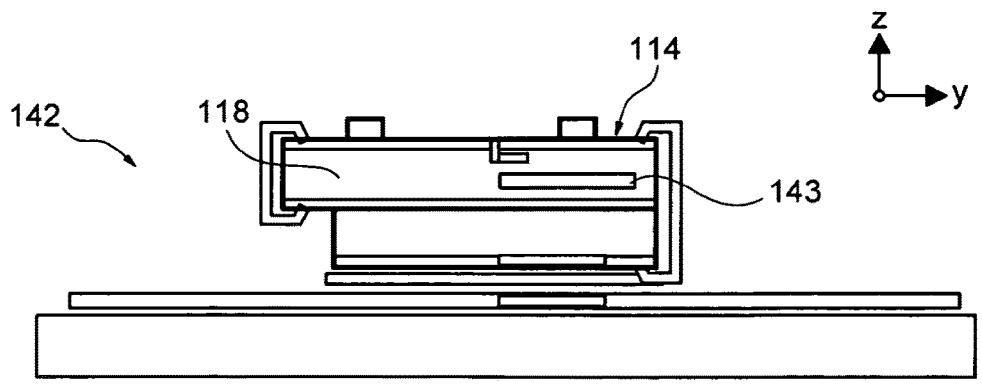
Figure 21:
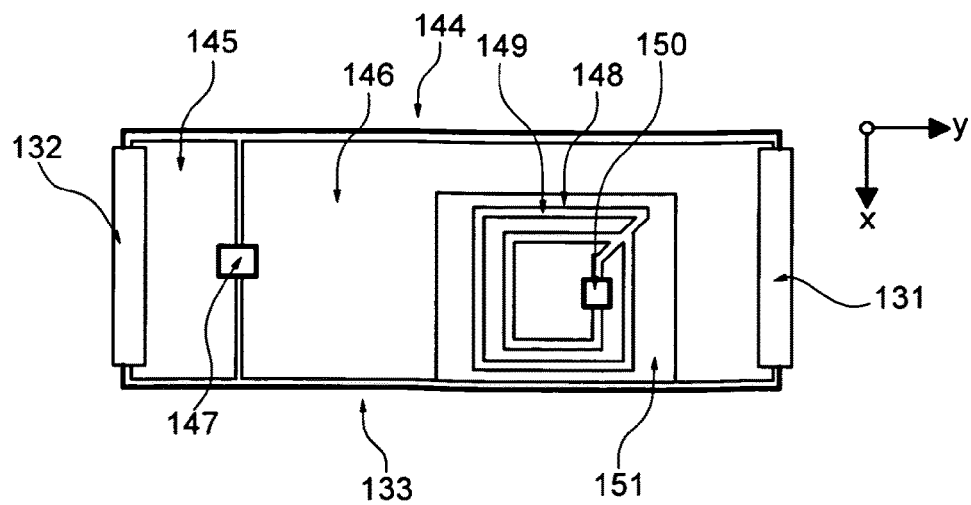
Figure 22:
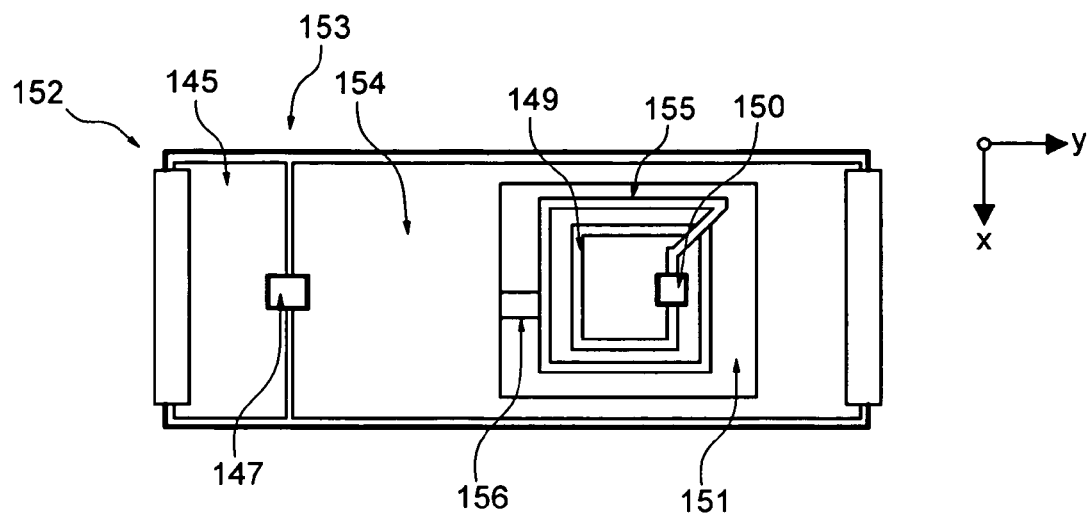
Figure 23:
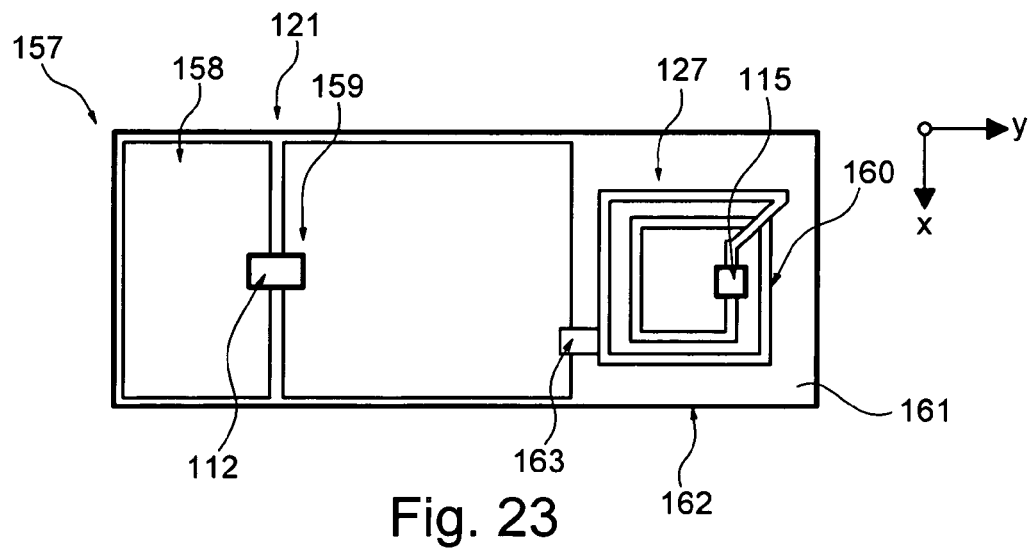
Figure 24:
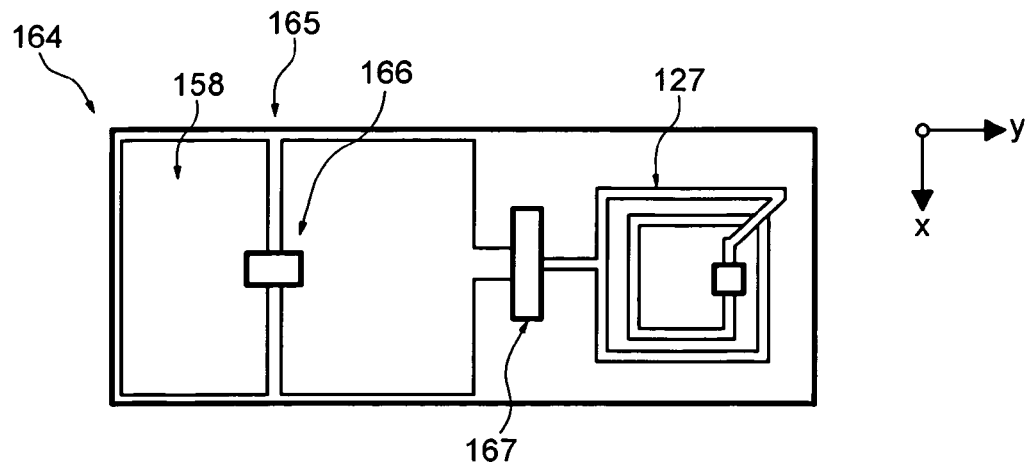

Shown are:

FIG. 1 a first embodiment of a transponder apparatus in a side view;

FIG. 2 a second embodiment of a transponder apparatus in a side view;

FIG. 3 a third embodiment of a transponder apparatus in a side view;

FIG. 4 a fourth embodiment of a transponder apparatus in a side view;

FIG. 5 a first embodiment of a transponder support in a sectional view;

FIG. 6 a second embodiment of a transponder support in a sectional view;

FIG. 7 a third embodiment of a transponder support in a sectional view;

FIG. 8 a fifth embodiment of a transponder apparatus in a top view;

FIG. 9 a sixth embodiment of a transponder apparatus in a top view;

FIG. 10 a seventh embodiment of a transponder apparatus in a top view;

FIG. 11 an eighth embodiment of a transponder apparatus in a top view;

FIG. 12 a ninth embodiment of a transponder apparatus in a top view;

FIG. 13 a tenth embodiment of a transponder apparatus in a side view;

FIG. 14 an eleventh embodiment of a transponder apparatus in a side view;

FIG. 15 a twelfth embodiment of a transponder apparatus in a side view;

FIG. 16 a thirteenth embodiment of a transponder apparatus in a side view;

FIG. 17 a fourteenth embodiment of a transponder apparatus in a side view;

FIG. 18 a fifteenth embodiment of a transponder apparatus in a side view;

FIG. 19 a sixteenth embodiment of a transponder apparatus in a side view;

FIG. 20 a seventeenth embodiment of a transponder apparatus in a side view;

FIG. 21 a fourth embodiment of a transponder support in a top view;

FIG. 22 a fifth embodiment of a transponder support in a top view;

FIG. 23 a sixth embodiment of a transponder support in a top view;

FIG. 24 a seventh embodiment of a transponder support in a top view;

FIG. 1 shows a transponder apparatus 10 in a schematically-shown side view and longitudinal section view. The transponder apparatus 10 comprises a transponder support 11, which is shown here in simplified fashion, with a UHF transponder which is not shown in more detail, an HF transponder 12, an attachment layer 13 and a spacer element 14. The HF transponder 12 is made up of an HF chip 15 and an HF antenna 16, wherein the HF antenna 16 is made up of a conducting HF antenna structure 17. The HF antenna structure 17 further comprises a bridge 18 to which conductor ends of windings of the HF antenna structure 17, the conductor ends not shown in more detail, are connected away from the windings. An arrow 19 identifies here and in the following figures the position of the transponder apparatus 10 relative to a human or animal body 20, the purpose of the position being to provide a function of the transponder apparatus 10. Accordingly, the spacer 14 always faces the body 20 and the HF transponder 12, which in this case is formed without a substrate, is disposed or attached on a side 21 of the spacer 14 facing away from the body 20 by way of an adhesion or lamination process. The following information on the position of components always refers to the intended position of the component relative to the body 20. The attachment layer 13 is applied to the HF antenna structure 17, said layer permanent attaching the transponder support 11 to the HF antenna structure 17. The transponder support 11 covers only a portion of a surface 22 of the HF antenna structure 17 in this case. On the surface 22, the HF chip 15 is further contacted with the HF antenna structure 17 or with conductor ends which are not shown in more detail here. Since the HF transponder 12 is disposed below the transponder support 11 and below the UHF transponder, which is not shown, and extends beyond the UHF transponder, it becomes possible to easily locate or identify the UHF transponder using a transmitter/receiver system, which is not shown here, without limiting a functionality of the HF transponder beyond the extent required. Further, the use of a shielding element or a layer can be eliminated through the use of the spacer element 14 since the transponder support 11 is then sufficiently far away from the body 20. The HF chip 15 is contacted with the HF antenna structure 17 by way of flip chip technology. Alternatively, the HF chip 15 can also be contacted by way of bonding, soldering, US bonding, SNAP.

FIG. 2 shows a transponder apparatus 23 in which in contrast to the transponder apparatus from FIG. 1 the HF chip 15 is embedded into the material of the spacer element 14, at least in areas. The material of the spacer element 14 is a plastic material such that a HF transponder 24 can be fixed to side 21 by way of hot lamination. The HF chip 15 is advantageously protected by being incorporated in the spacer element 14.

FIG. 3 shows a transponder apparatus 25 in which in contrast to the transponder apparatus in FIG. 1 an HF transponder 26 is formed with a support substrate 27 made from a plastic material. The HF antenna structure 17 and a bridge 28 together form an HF antenna 29. The bridge 28 here is formed by way of through-contacting 30, wherein the bridge can also be formed by way of a clip, which is not shown here. It would also be conceivable to incorporate the HF chip 15 in the support substrate 27.

Another embodiment of a transponder apparatus 31 is shown in FIG. 4, wherein here, in contrast to the transponder apparatus from FIG. 3 a bridge 32 is formed on a top side 33 of the HF antenna structure 17.

FIG. 5 shows a schematic sectional view of a transponder support 34. Arrow 19 in turn indicates a position where the transponder support 34 is used relative to the body 20. Here, the transponder support 34 is made up of an upper substrate layer 35 and a lower substrate layer 36 in a stacked arrangement 37, wherein a UHF antenna 38 together with a UHF chip 39 and the substrate layers 35 and 36 form a UHF transponder 40. An upper UHF antenna structure 41 is disposed on the top substrate layer 35, wherein a middle UHF antenna structure 42 is disposed between the upper substrate layer 35 and the lower substrate layer 36, and a bottom UHF antenna structure 43 is disposed below the lower substrate layer 36. The upper UHF antenna structure 41 is connected electrically conducting to the lower UHF antenna structure 43 by way of a clip 44, and the upper UHF antenna structure 41 is also connected electrically conducting to the middle UHF antenna structure 42 by way of a clip 45. The substrate layers 35 and 36 as well as the UHF antenna structures 41 to 43 are in addition connected together by way of lamination, but can also be connected together by way of adhesion, in particular hot gluing. Clips 44 and 45 are simply pushed or slid onto UHF antenna structures 41 to 43, wherein a spring force is exerted by clip 44 and 45 onto UHF antenna structures 41 to 43, which provides for an especially secure electrically-conducting connection. This force-fitted connection has proven to be particularly advantageous where there are especially high mechanical stresses of the transponder support 34. Alternatively, it would also be possible to establish a connection by way of soldering, adhesive material or welding. The UHF chip 39 is contacted with the upper UHF antenna structure 41 using a known contacting method from the prior art in accordance with the examples described. In an embodiment not shown here, the UHF chip 39 can also be disposed inside the upper substrate layer 35.

FIG. 6 shows a transponder support 46 in which in contrast to the transponder support from FIG. 5, instead of clips inductive coupling elements 47 are disposed at an upper UHF antenna structure 48, middle UHF antenna structure 49 and lower UHF antenna structure 50. The UHF antenna structures 48 to 50 can be inductively connected together this way by way of the inductive coupling elements 47. Alternatively, it is also possible to use capacitive coupling elements. The inductive coupling elements 47 make it possible to allow greater tolerances for a relative positioning of the UHF antenna structures 48 to 50, especially in the large-scale manufacturing of the transponder support 46.

FIG. 7 shows a transponder support 51 in which in contrast to the transponder support from FIG. 6 the UHF chip 39 is disposed on the middle UHF antenna structure 49 within the upper substrate layer 35.

FIG. 8 shows a transponder apparatus 52 in a top view with an HF transponder 53 and the transponder support 11 disposed on the HF transponder 53 and fastened by way of an attachment layer which is not visible here. An HF antenna 54 of the HF transponder 53 is galvanically connected to an HF chip 55 by way of flip chip connection methods. The HF antenna 54 comprises a plurality of differently shaped windings 56 of an HF antenna structure 57. Conductor ends 58 and 59 are connected by way of a bridge 60. The HF chip 55 is contacted at conductor ends 61 and 62. Conductor ends 61 and 62 in particular are designed broader in surface area than the remaining windings 56 and form a resonator 63 or a UHF resonator structure 64 for a UHF transponder of the transponder support 11, the transponder not visible here.

By disposing the transponder support 11 on the HF antenna 54, a coverage surface 65 of the UHF transponder, which is not shown further, and the HF antenna structure 57 result. The majority of the HF antenna structure 57 extents beyond the covering surface 65. Also, an effective UHF resonator structure 66 results within the covering surface 65, the structure being formed by the conductor ends 61 and 62 near the covering surface 65.

FIG. 9 shows a transponder apparatus 67 in which in contrast to the transponder apparatus in FIG. 8 windings 68 are broader and a resonator structure 69 is differently designed. This results in non-metallized notches 72 and 73 being formed inside of conductor ends 70 and 71, which form the resonator structure 69 among other things. Field lines of an HF field are less blocked by metallic surfaces this way, which improves a recognizability of an HF transponder 74.

FIG. 10 shows a transponder apparatus 75 in which in contrast to the transponder apparatus from FIG. 9 a winding section 76 forms a UHF resonator structure 77. This can cause a characteristic of a resonator 78 to improve.

FIG. 11 shows a transponder apparatus 79 in which in contrast to the transponder apparatus from FIG. 10 a resonator 80 is formed galvanically separated from an HF transponder 81. A UHF resonator structure 82 is formed from two resonator surfaces 83 which are connected together conductively and which are spatially separated from an HF antenna 84. Disposed at a transponder support 85 is a UHF antenna 86 with a winding 87. A capacitive coupling to the resonator 80 can be made by way of the UHF antenna 86. The UHF resonator structure 82 is formed in a common plane 88 with the HF antenna 84.

FIG. 12 shows a transponder apparatus 89 in which in contrast to the transponder apparatus from FIG. 11 an inductive coupling element 90 is formed in the shape of a conductive loop 91. In this way, the UHF resonator structure 92 thus formed can be inductively coupled to a UHF antenna, which is not shown here.

FIG. 13 relates to a transponder apparatus 93 corresponding to the transponder apparatus from FIG. 3 having the transponder support described in FIG. 7. In contrast with this, inductive coupling elements 94 and 95 are disposed on a lower UHF antenna structure 96 and an HF antenna structure 97 here such that a connection of a UHF antenna 98 with an HF antenna 99 is possible by way of an inductive interaction.

FIG. 14 shows a transponder apparatus 100 in which in contrast to the transponder apparatus from FIG. 13 a transponder support 101 is formed, the support having a single substrate layer 102 and hence an upper UHF antenna structure 103 and a lower UHF antenna structure 104. The upper UHF antenna structure 103 is connected to the lower UHF antenna structure 104 by way of a conducting connecting structure 105 on a side surface 106 of the substrate support 102. A UHF chip 107 is disposed on the upper UHF antenna structure 103.

FIG. 15 shows another embodiment of a transponder apparatus 108 comprising a UHF transponder 109 with a transponder support 110, a UHF antenna 111 and a UHF chip 112. The transponder apparatus 108 further comprises an HF transponder 113 with an HF antenna 114 and an HF chip 115 as well as an attachment layer 116 and a spacer element 117. The transponder support 110 comprises an upper substrate layer 118 and a lower substrate layer 119 in a stacked arrangement 120. The UHF antenna 111 is made up of an upper UHF antenna structure 121, a middle UHF antenna structure 122 and a lower UHF antenna structure 123, each of which being inductively connected together by way of inductive coupling elements 124. On a top side 125 of the upper substrate layer 118 or transponder support 110 is the UHF chip 112, which is contacted directly on the upper UHF antenna structure 120. The HF antenna 114 is likewise disposed on the top side 125 at a distance from the upper UHF antenna structure and is formed from windings, which are not shown in more detail here and which are connected electrically conducting by way of a bridge 126. The HF chip 115 is contacted with an HF antenna structure 127, which is not shown here in more detail.

FIG. 16 shows a transponder apparatus 128 in which in contrast to the transponder apparatus from FIG. 15 a UHF resonator 129 is disposed intermediately between the attachment layer 116 and the spacer element 117. The UHF resonator structure 129 supports a function of the UHF transponder 109.

FIG. 17 shows a transponder apparatus 130 in which in contrast to the transponder apparatus from FIG. 15 instead of inductive coupling elements, clips 131 and 132 are used to establish an electrically conducting connection between an upper UHF antenna structure 133, a middle UHF antenna structure 134 and a lower UHF antenna structure 135. The clips 131 and 132 are used in the same manner as in the transponder support described in FIG. 5.

FIG. 18 shows a transponder apparatus 136 in which in contrast to the transponder apparatus from FIG. 17 a UHF resonator structure 129 according to the transponder apparatus embodiment from FIG. 16 is used.

FIG. 19 shows a transponder apparatus 137 in which in contrast to the transponder apparatus from FIG. 18 inductive coupling elements 138 and 139 are disposed or formed at a lower UHF antenna structure 140 and a UHF resonator structure 141.

FIG. 20 shows a transponder apparatus 142 in which in contrast to the transponder apparatus from FIG. 19 an inductive coupling element 143 is disposed within the upper substrate layer 118 and below the HF antenna 114 for the purposes of guiding field lines of the HF antenna 114.

FIG. 21 shows a transponder support 144 in a top view corresponding to the transponder support shown in FIG. 17. The upper UHF antenna structure 133 is formed here from metallic surface sections 145 and 146. A UHF chip 147 is contacted on surface sections 145 and 146. Surface section 145 is connected to the UHF antenna structures, which are located below the section and not visible here, by way of clip 132 and surface section 146 is connected to the same structures by way of clip 131. An HF antenna structure 148 is formed by windings 149, wherein an HF chip 150 is contacted on the HF antenna structure 148. Surface sections 145 and 146 are disposed together with windings 149 in a common plane 151 on the transponder support 144. In the process, a geometric reach of the upper UHF antenna structure 133 is larger than the HF antenna structure 148.

FIG. 22 shows an embodiment of a transponder support 152 in which in contrast to the transponder support from FIG. 21 an upper UHF antenna structure 153 with a surface section 154 is formed, the antenna structure completely surrounding or enclosing an HF antenna structure 155. Additionally, a galvanic connection 156 between surface section 154 and the HF antenna structure 155 is formed here, it being possible to adjust a resonance of a UHF antenna not shown fully here by way of this connection.

FIG. 23 shows a transponder support 157 which essentially corresponds to the transponder support from FIG. 15. The upper UHF antenna structure 121 is formed here using two surface sections 158 and 159. HF antenna structure 127 is formed by windings 160 and lies adjacent to UHF antenna structure 121 in a section 161 of a common plane 162. Here, as well, a galvanic connection 163 is formed between the UHF antenna structure 121 or surface section 159 and HF antenna structure 127.

FIG. 24 shows a transponder support 164 in which in contrast to the transponder support from FIG. 23 an upper UHF antenna structure 165 comprises a surface section 166 that is shortened in comparison with the surface section in FIG. 23. Here, an inductive coupling element 167 for connecting HF antenna structure 127 and UHF antenna structure 165 is formed instead of the galvanic connection.

The invention claimed is:

1. A transponder apparatus for a transponder unit configured to be worn on a human or animal body, comprising a UHF transponder and an HF transponder, wherein the UHF transponder is made up of a transponder support, a UHF antenna and a UHF chip, wherein the HF transponder is made up of an HF antenna and an HF chip, wherein the UHF antenna is disposed at the transponder support and is made up of conducting UHF antenna structures in transponder support planes which are spatially separated from one another,
wherein,
the transponder apparatus comprises an electrically-insulating attachment layer which connects the UHF transponder to the HF antenna, an electrically-insulating spacer element which is connected to the HF transponder and is configured to spatially separate the UHF transponder and the HF transponder from human or animal body such that functionality of the UHF transponder is not substantially affected by proximity to the human or animal body, wherein the UHF transponder is disposed on the HF antenna, wherein the HF transponder comprises a support substrate on which the HF antenna is disposed, and wherein a conducting HF antenna structure of the HF antenna extends beyond a covering surface of the UHF transponder and the HF antenna structure.

2. The transponder apparatus according to claim 1, wherein
the covering surface is smaller than ⅓ of a geometric reach of the HF antenna structure.

3. The transponder apparatus according to claim 1, wherein
the transponder apparatus comprises a resonator with a conducting UHF resonator structure.

4. The transponder apparatus according to claim 3, wherein
the conducting UHF resonator structure comprises a conducting resonator surface.

5. The transponder apparatus according to claim 3, wherein
the UHF resonator structure is formed in a conductor plane in common with the HF antenna structure.

6. The transponder apparatus according to claim 3, wherein
the UHF resonator structure is formed from at least one broadened winding section of a winding of the HF antenna structure.

7. The transponder apparatus according to claim 3, wherein
a surface section of the resonator surface overlaps with the covering surface.

8. The transponder apparatus according to claim 3, wherein
the UHF resonator structure comprises a coupling element for inductively or capacitively coupling the resonator to the UHF antenna.

9. A transponder apparatus for a transponder unit configured to be worn on a human or animal body, comprising a UHF transponder and an HF transponder, wherein the UHF transponder is made up of a transponder support, a UHF antenna and a UHF chip, wherein the HF transponder is made up of an HF antenna and an HF chip, wherein the UHF antenna is disposed on the transponder support and is made up of conducting UHF antenna structures in transponder support planes which are spatially separated from one another, wherein the HF antenna is disposed on the transponder support in a plane in common with an upper UHF antenna structure,
wherein
the transponder apparatus comprises an electrically-insulating attachment layer and an electrically-insulating spacer element, wherein the spacer element is connected to the UHF transponder by way of the attachment layer and is configured to spatially separate the UHF transponder and the HF transponder from the human or animal body such that a functionality of the UHF transponder is not substantially affected by the proximity to the human or animal body, wherein the upper UHF antenna structure at least partially surrounds the HF antenna.

10. The transponder apparatus according to claim 9, wherein
the transponder apparatus comprises a resonator with a conducting UHF resonator structure which is disposed on the spacer element.

11. The transponder apparatus according to claim 9, wherein
a galvanic connection is established between the HF antenna structure and the upper UHF antenna structure.

12. The transponder apparatus according to claim 9, wherein
the upper UHF antenna structure has a larger geometric reach than a conducting HF antenna structure of the HF antenna in said common plane.

13. The transponder apparatus according to claim 9, wherein
the HF transponder comprises an inductive coupling element within the transponder support and below the HF antenna structure, the coupling element guiding field lines of the HF antenna.

14. The transponder apparatus according to claim 9, wherein
the transponder support is made up of substrate layers in a stacked arrangement, wherein the conducting UHF antenna structures are formed in at least three transponder support planes.

15. The transponder apparatus according to claim 9, wherein
the conducting UHF antenna structures are connected conductively by way of at least one clip, wherein the clip grasps the planes of the transponder support and applies a clamping force to UHF antenna structures which are oppositely disposed in the respective planes.

16. The transponder apparatus according to claim 9, wherein
the transponder support comprises inductive or capacitive coupling elements which inductively or capacitively connect the UHF antenna structures which are oppositely disposed in the respective planes.

17. The transponder apparatus according to claim 9, wherein
an inductive or capacitive connection is established between the HF antenna structure and the UHF antenna structure by way of inductive or capacitive coupling elements.

18. A transponder unit configured to be worn on a limb of a human or animal body,
wherein
the transponder unit comprises a transponder apparatus, the transponder apparatus comprises a UHF transponder and an HF transponder, wherein the UHF transponder is made up of a transponder support, a UHF antenna and a UHF chip, wherein the HF transponder is made up of an HF antenna and an HF chip, wherein the UHF antenna is disposed at the transponder support and is made up of conducting UHF antenna structures in transponder support planes which are spatially separated from one another, the transponder apparatus comprises an electrically-insulating attachment layer which connects the UHF transponder to the HF antenna, wherein the transponder apparatus comprises an electrically-insulating spacer element which is connected to the HF transponder to spatially separates the UHF transponder and the HF transponder relative to the body such that the functionality of the UHF transponder is not substantially affected by the proximity to the limbs of the human or animal body, wherein the UHF transponder is disposed on the HF antenna, wherein a conducting HF antenna structure of the HF antenna extends beyond a covering surface of the UHF transponder and the HF antenna structure.

19. The transponder unit according to claim 18, wherein
the transponder unit comprises a housing made of plastic, the housing enclosing the transponder apparatus.

20. A transponder unit configured to be wearable on a limb of a human or animal body, wherein the transponder unit comprises a transponder apparatus, the transponder apparatus comprising a UHF transponder and an HF transponder, wherein the UHF transponder is made up of a transponder support, a UHF antenna and a UHF chip, wherein the HF transponder is made up of an HF antenna and an HF chip, wherein the UHF antenna is disposed on the transponder support and is made up of conducting UHF antenna structures in transponder support planes which are spatially separated from one another, wherein the HF antenna is disposed on the transponder support in a plane in common with an upper UHF antenna structure, the transponder apparatus comprises an electrically insulating attachment layer and an electrically insulating spacer element, wherein the spacer element is connected to the UHF transponder by way of the attachment layer is configured to spatially separate the UHF transponder and the HF transponder from the body relative thereto such that the functionality of the UHF transponder is not substantially affected by the proximity to the limbs of the human or animal body, wherein the HF transponder comprises a support substrate on which the HF antenna is disposed, and wherein the upper UHF antenna structure at least partially surrounds the HF antenna structure.

* * * * *